March 14, 1950  R. L. WHITELEY  2,500,592
SELF-LUBRICATING, SELF-ALIGNING BEARING
Filed Aug. 7, 1947  2 Sheets-Sheet 2
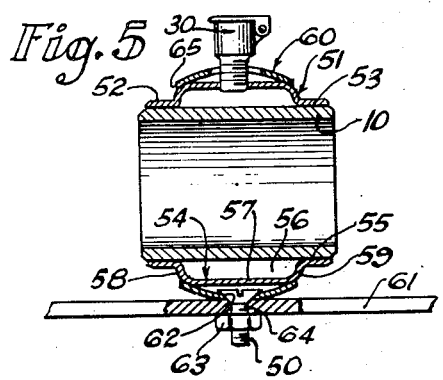
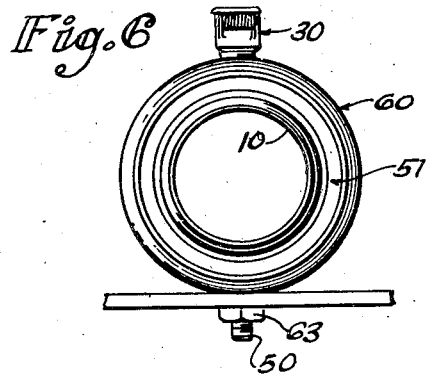
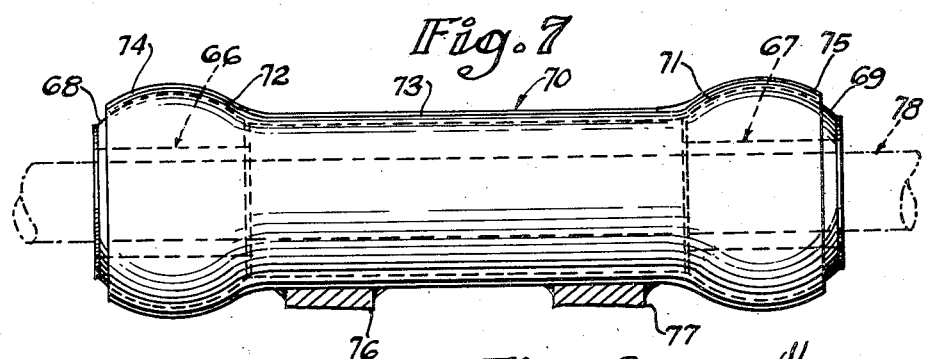
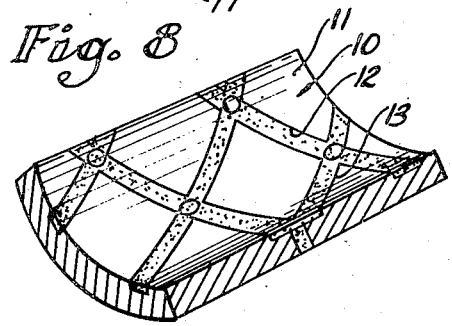
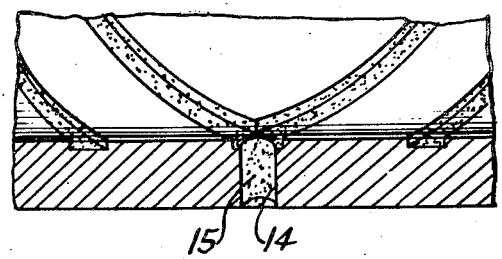
INVENTOR.
Robert L. Whiteley
BY Robert H. Wendt
ATTORNEY Patented Mar. 14, 1950

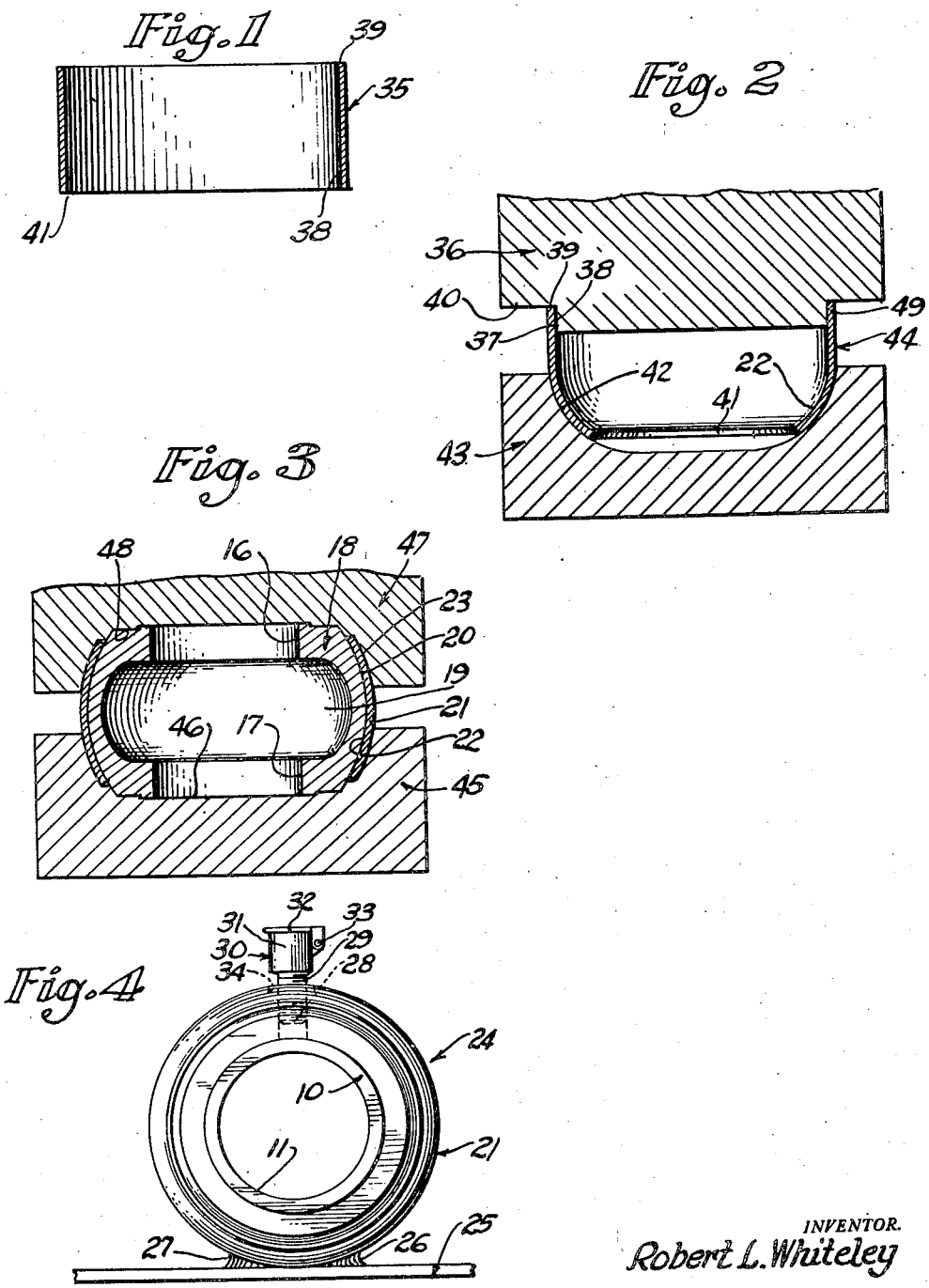

2,500,592

UNITED STATES PATENT OFFICE 2,500,592

SELF-LUBRICATING, SELF-ALIGNING BEARING

Robert L. Whiteley, Oak Park, Ill., assignor of one-third to Kenneth E. Whiteley and one-third to Howard C. Whiteley, Chicago, Ill.

Application August 7, 1947, Serial No. 767,053

3 Claims. (Cl. 308—72)

The present invention relates to self-lubricating, self-aligning bearings, and is particularly concerned with bearings of the type having a reservoir which can be filled with a supply of lubricant to be dispensed uniformly over a long period of time.

The self-aligning, self-lubricating bearings of the prior art are popularly called "pillow block" bearings, and all of them have in common the following characteristics. If the pillow block is made of cast metal, the reservoir is usually clamped between a pair of complementary members by means of a pair of bolts; and the housing for the pillow block bearings of the prior art usually has laterally projecting attaching flanges for receiving bolts, by means of which it is mounted on a suitable base.

Even the sheet metal housings for self-lubricating universal bearings in the prior art are equipped with this enlarged housing that projects laterally at its wide base for reception of securing bolts, and such housings obstruct the flow of air when the self-lubricating bearing is employed for supporting the shaft of a blower.

On blowers, and even ordinary fans, the air passes axially along the supporting shaft; and the bearings of the prior art interfere with the flow of the air by reason of their enlarged housings and enlarged bases, which occupy a considerable amount of space in the inlet of a blower or about the shaft of a fan.

One of the objects of the invention is the provision of improved forms of bearings of the self-lubricating and self-aligning type which occupy a minimum amount of space in the stream of the air flow, so that they do not obstruct the air flow, but facilitate its flow as much as possible.

Another object of the invention is the provision of a plurality of different forms of bearings which are streamlined and of minimum cross-sectional area so that they will not obstruct the air flow along the shaft of a fan or into the inlet of a centrifugal blower.

Another object of the invention is the provision of improved forms of bearings of the class described, in which the number of its parts has been reduced to a minimum, and in which all the unnecessary clamping bolts and securing bolts and housing halves may be eliminated so that the bearings may be constructed at a very low cost, thereby reducing the overall cost of the equipment and placing the equipment within a price range that is available to a larger number of the purchasing public.

Another object of the invention is the provision of improved bearings of the class described which are durable, capable of being used for a long period of time without necessity for repair or replacement, economical, and in which the number of machine operations have been reduced to a minimum.

Other objects and advantages of the invention will be apparent from the following description and the accompanying drawings, in which similar characters of reference indicate similar parts throughout the several views.

Referring to the two sheets of drawings accompanying this specification:

Fig. 1 is an axial sectional view taken through a piece of metal tubing of a size adapted to be used for the external housing and support of a self-aligning, self-lubricating bearing embodying my invention;

Fig. 2 illustrates the second step in the making of such a housing, during which step one end of the tubing is contracted to a partially spherical form;

Fig. 3 illustrates the structure of such a bearing, which is complete except for the bearing bushing; and it also illustrates the third step in the making of the bearing and housing;

Fig. 4 is an end elevational view of a bearing embodying my invention, shown secured to a transverse frame member on the blower, by welding;

Fig. 5 is an axial sectional view of a modification of the bearing and showing another form of support of the bearing on a frame member;

Fig. 6 is an end elevational view of the bearing of Fig. 5;

Fig. 7 is a side elevational view of a twin form of a bearing of the class described, which is particularly adapted to be used for supporting a fan shaft;

Fig. 8 is a fragmentary view in perspective of the bearing surface and structure of a bearing bushing of one type that may be employed in the preceding bearings;

Fig. 9 is a fragmentary sectional view, taken through a portion of the bearing bushing, showing one mode of feeding the lubricant from the reservoir to the bearing surface.

Referring to Figs. 8 and 9, these are fragmentary views illustrating one form of bearing bushing that may be employed. For example, the bearing bushing 10 may have an inner cylindrical surface 11, which is provided with two series of intersecting grooves 12 and 13 in its bearing surface.

The grooves are preferably uniformly spaced, and may extend in various directions; but preferably extend spirally so that the lubricant is spread uniformly over the full bearing surface 11. In order to feed the lubricant from a reservoir the bearing bushing 10 may be provided with a plurality of through bores 14, which communicate with the grooves 12 and 13. In order to distribute the lubricant uniformly to the grooves the bores 14 may be located at intersections of the grooves 12 and 13.

The bores 14 and grooves 12 and 13 are preferably filled with an initially plastic porous compound 15, which may also contain graphite, the graphite serving to assist in the conditioning of the bearing surface 11 and giving it a hard, shiny surface after the bearing has been worked in.

Other forms of bearing bushings may consist of bushings that are made in tubular form by compressing metallic powders containing graphite or carbon, which is then burned out of the bearing bushings, leaving them porous.

Referring to Figs. 3 and 4, these views show one of the simplest forms of a self-lubricating bearing embodying the invention. In Fig. 4, 10 indicates a bearing bushing of the type adapted to feed lubricant from a reservoir to a bearing surface 11. The bushing 10 is frictionally held in the aligned bores 16, 17 of a partially ball-shaped metal member 18, which forms a reservoir at 19, when assembled with the bushing 10.

In some forms of the invention graphite filled grooves may be employed without communication with the reservoir bushing, having a plurality of apertures of capillary size to feed lubricant from the reservoir to the bearing surface.

The reservoir 19 is formed by an inner groove in the partially ball-shaped member 18, which groove is closed by the bearing bushing 10 at the surfaces 16 and 17. In the bearing of Fig. 3 the reservoir member 18 has an external, partially spherical surface 20, which serves to mount the reservoir member 18 for a limited universal movement.

The member 18 may comprise a metal casting, which is formed with the reservoir groove 19 by means of cores and with relatively smaller, roughly outlined bores that are later accurately machined to the aligned bores 16 and 17. The external surface of such a casting may be substantially partially spherical, and it is also machined to a more accurate spherical surface 20.

The ball reservoir 18 is preferably supported by means of a housing 21, which is initially tubular in form, and which is shaped by means of dies to a partially spherical shape, as shown in Fig. 3. Thus the housing 21 has an inner, partially spherical surface 22, which is complementary to the external, partially spherical surface 20 of the ball 18.

The fit between these two members is a sliding fit, the housing 21 gripping the ball 18 resiliently. The external surface 23 of the housing member 21 is also partially spherical and of minimum size. One of the most important characteristics of this housing is that it is streamlined and has no flanges or wings which extend transversely to the air current or which obstruct the air current flow.

Instead of requiring attaching bolts, the bearing assembly 24 is secured to a transverse frame member 25, which extends across the inlet of a centrifugal blower by having its housing 21 welded at 26, 27 on each side of the assembly 24 to the frame member 25.

The housing 23 is preferably made out of tubular steel, which is readily welded to the steel frame member 25, but it may also be made out of any other suitable metal, such as brass or any of the light metals, such as aluminum or magnesium.

In order to provide for the filling of the reservoir, the ball member 18 is preferably provided with a threaded bore 28 for receiving the threaded supply tube 29 of an oil cup 30. The oil cup has an enlarged cup 31 at the upper end of its tube 29, and it preferably has a cover 32 pivotally mounted at 33 and spring pressed to the closed position.

The threaded tube 29 is threaded tightly into the bore 28, whereby lubricant, which is placed in the cup 31, runs down into the reservoir 19.

The ball housing 21 preferably has an enlarged bore 34 surrounding the tube 29 of the oil cup 30 so as to permit a limited amount of universal movement of the ball 18 within the housing 21 without the oil cup interfering with such movement.

Referring now to Figs. 1 to 4, these illustrate an improved method of making such self-lubricating bearings. In Fig. 1, 35 illustrates a short section of steel tubing, preferably of the seamless type, which has been cut off to the proper length for assembly with a ball reservoir 18.

The tubing 35 is first mounted upon a die member 36, which has a mounting cylinder 37 that is complementary to the inner cylindrical surface 38 of the tube. The upper end 39 of the tube abuts against an annular shoulder 40 on the die 36. The other end 41 of the tubular blank 35 is then forced into a partially spherical socket 42 in a second die member 43 so that this end 41 of the tube assumes a partially spherical shape with an inner surface 22 that is complementary to the external surface 20 of a ball reservoir 18. Seamless tubing may be employed for the housing, but I prefer to use annealed welded tubing because it bends easier and is cheaper.

The ball reservoir, which has been previously cast and machined to size, is then placed in the partially formed tube 44 of Fig. 2; and the assembly may be supported by means of the same die 43 or a second form of die 45, the socket 46 of which is complementary to the assembly of the ball 18 and housing 21.

The upper die 47 has a socket 48, which is complementary in shape to the assembly of the ball 18 and housing 21 and adapted to draw in and shape the upper cylindrical portion 49 of the blank 44 of Fig. 2. Thus the housing 21 is brought into partially spherical shape at its upper end, and at the same time it is assembled with the ball reservoir 18.

The housing 21 may be provided with the enlarged aperture 34 before or after its application to the ball reservoir 18; and the ball reservoir 18 may have its bore 28 threaded before or after its assembly with the housing 21.

In order to complete the bearing it is only necessary thereafter to press the bearing bushing 10 into the aligned bores 16 and 17 by means of a press, so that the bearing bushing has a tight frictional fit in these bores, thereby closing the reservoir 19. The oil cup tube may also have a pressed fit in the ball reservoir.

The oil cup 30 may then be assembled with the ball reservoir 18, and the assembly 24 may be mounted on a frame 25, either by welding, as shown at 26, 27, or by means of a single screw bolt 50, as will be further described with respect to Figs. 5 and 6.

Referring to Figs. 5 and 6, these views show a modification in which the bearing sleeve 10 may again be made as described with respect to Figs. 1 to 4. In this case the bearing housing or reservoir member 51 is made of sheet metal and comprises a tubular member formed with cylindrical end portions 52, 53 joined by a peripheral bulging portion 54.

The bearing bushing 10 has a frictional fit on the inner cylindrical surfaces 55 of the cylindrical end portions 52, 53, forming the reservoir 56. The bulging portion 54 may have a substantially cylindrical middle wall 57 and may be partially spherical only at its end portions 58, 59.

In this case the outer housing 60 may be exactly the same in construction as described with respect to Figs. 3 and 4 and may be applied to the partially ball-shaped reservoir portion 54 in exactly the same manner.

The reservoir member 51 supports a similar oil cup 30, but the tubular housing 60 is secured to the transverse frame member 61 by means of a single screw bolt 50. This bolt may pass through a countersunk aperture 62 in the housing 60, in which it may have its beveled head countersunk.

The bolt 50 passes through an aperture in the frame member 61 and the bearing member secured by means of a nut 63. The aperture 64 in the frame member 61 is also preferably countersunk to receive part of the head of the bolt. In this case the amount of universal movement of the reservoir member 51 in the housing 60 is limited by the engagement of the ends 65 of the housing 60 with the cylindrical portions 52, 53.

The bolt 50, however, permits an additional swivel action, aiding in the alignment of the bearing; and the complete assembly is streamlined so that it does not obstruct the flow of air past the bearing into the inlet of a centrifugal blower.

The reservoir, housing, and bushing may be made of cast or sheet metal; and either of them may be made of iron, brass, bronze or aluminum.

Referring to Fig. 7, this is a modification similar to Figs. 3 and 4 in construction, but including a pair of spaced bearing bushings 66, 67 carried by similar reservoir members 68, 69, and supported for universal movement in a common sleeve or tube 70. In this case the tube 70 is first formed with the inner rounded or partially spherical portions 71, 72 in the same manner as described with respect to Fig. 2, except that the die has an aperture for passing the central tubular portion of the assembly 70.

The partially spherical portions 71, 72, having been formed, the ball-shaped reservoir members 68, 69 may be placed in these rounded portions successively; and the tube may be acted on by dies to draw in the rounded end portions 74, 75, thus securing the balls 68 and 69 permanently in the tubular member 70.

As distinguished from the method of Fig. 2, in this case the inner ball-shaped portions 71, 72 are formed by spreading the tube, which may initially be of the size shown at the central portion 73. At this time each end of the tube will look substantially as shown in Fig. 2. Thereafter the ball and bushing assembly may be placed in the socket formed at each end of the tube 70 and the end portions 74, 75 drawn in or contracted about the balls 68, 69 to the form shown in Fig. 7.

The tubular member 70 may be welded to a transverse frame member 25, as shown in Fig. 4; or if the strains that are placed upon the assembly warrant it, two such transverse frame members 76, 77 may be welded to the tube 70 to support it.

The fan blade will then be supported on one end of the shaft 78 and a V pulley upon the other end, as is common in the prior art with other types of bearings.

The twin bearing of Fig. 7 may have each of its reservoirs provided with the same oil cup 30 for replenishment of its supply of lubricant.

It should be understood that in all of these bearings the bushings may be of the type illustrated in Figs. 8 and 9 or they may be bushings which are of a porous metal composition, through which the oil is fed to the bearing surface from the reservoir.

It will thus be observed that I have invented an improved form of self-lubricating, self-aligning bearing which is totally devoid of attaching flanges and air obstructing wings, and which is streamlined so that it will provide a minimum obstruction to the flow of the air.

The present bearings may be constructed more cheaply than the devices of the prior art; and the dies which are used for their manufacture are relatively simple and less expensive. The machining operations are reduced to a minimum, and the assembly is accomplished during the manufacture of the outer housing.

Thus the present bearing structures may be manufactured at a very low cost, and they are more efficient than the devices of the prior art because they do not obstruct the air flow, and thus provide a maximum air flow at a minimum cost.

My method of making these bearings is relatively simple and requires a minimum amount of apparatus.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a self-lubricating bearing, the combination of a bearing bushing provided with a plurality of inter-crossing grooves on its inner cylindrical bearing surface, the said grooves being filled with a porous carbon composition, said bushing having a plurality of through apertures of capillary size for transmitting lubricant through the bushing, with a reservoir member comprising a sheet metal tubular member, said tubular member having a pair of short cylindrical portions at each end having frictional engagement with the outside of said bearing bushing, and said tubular member having a central enlarged substantially cylindrical portion joined to the end cylindrical portions by annular offsets, said annular offsets having partially spherical corners, and said enlargement forming a reservoir, a threaded bore in said enlargement, and an oil cup threaded into said bore, for supplying said reservoir with lubricant, and a universal supporting member comprising a sheet metal tube which is upset at each of its ends to form a restriction at each end and an enlargement intermediate the ends, the said latter tube being upset directly upon said reservoir member and engaging the partially spherical portions of said offsets to provide a limited universal movement of the reservoir member inside the supporting member.

2. In a self-lubricating bearing, the combination of a bearing bushing provided with a plurality of inter-crossing grooves on its inner cylindrical bearing surface, the said grooves being filled with a porous carbon composition, said bushing having a plurality of through apertures of capillary size for transmitting lubricant through the bushing, with a reservoir member comprising a sheet metal tubular member, said tubular member having a pair of short cylindrical portions at each end having frictional engagement with the outside of said bearing bushing, and said tubular member having a central enlarged substantially cylindrical portion joined to the end cylindrical portions by annular offsets, said annular offsets having partially spherical corners, and said enlargement forming a reservoir, a threaded bore in said enlargement, and an oil cup threaded into said bore, for supplying said reservoir with lubricant, and a universal supporting member comprising a sheet metal tube which is upset at each of its ends to form a restriction at each end and an enlargement intermediate the ends, the said latter tube being upset directly upon said reservoir member and engaging the partially spherical portions of said offsets to provide a limited universal movement of the reservoir member inside the supporting member, the said supporting member being rotatably mounted upon a transverse metal bar, providing a minimum amount of resistance to the passage of air around said self-lubricating bearing.

3. In a self-lubricating bearing, the combination of a bearing bushing provided with a plurality of inter-crossing grooves on its inner cylindrical bearing surface, the said grooves being filled with a porous carbon composition, said bushing having a plurality of through apertures of capillary size for transmitting lubricant through the bushing, with a reservoir member comprising a sheet metal tubular member, said tubular member having a pair of short cylindrical portions at each end having frictional engagement with the outside of said bearing bushing, and said tubular member having a central enlarged substantially cylindrical portion joined to the end cylindrical portions by annular offsets, said annular offsets having partially spherical corners, and said enlargement forming a reservoir, a threaded bore in said enlargement, and an oil cup threaded into said bore, for supplying said reservoir with lubricant, and a universal supporting member comprising a sheet metal tube which is upset at each of its ends to form a restriction at each end and an enlargement intermediate the ends, the said latter tube being upset directly upon said reservoir member and engaging the partially spherical portions of said offsets to provide a limited universal movement of the reservoir member inside the supporting member, the said supporting member being rotatably mounted upon a transverse metal bar, providing a minimum amount of resistance to the passage of air around said self-lubricating bearing, the said bar having a through bore, and the said supporting member having a through bore, and a threaded member having a relatively small head located in the enlargement of said supporting member and passing through registering bores in the supporting member and the bar to secure them together.

ROBERT L. WHITELEY.

REFERENCES CITED

The following references are of record in the file of this patent:

UNITED STATES PATENTS

| Number | Name | Date |
|---|---|---|
| 1,050,422 | Birchwood | Jan. 14, 1913 |
| 1,663,254 | Hufferd | Mar. 20, 1928 |
| 1,793,874 | Skillman | Feb. 24, 1931 |
| 1,909,430 | Skillman | May 16, 1933 |
| 1,917,502 | Crawford et al. | July 11, 1933 |
| 1,943,631 | Skillman | Jan. 16, 1934 |
| 2,048,763 | Whiteley | July 28, 1936 |
| 2,123,872 | Whiteley | July 19, 1938 |